(12) United States Patent
Okazaki et al.

(10) Patent No.: US 11,535,569 B2
(45) Date of Patent: Dec. 27, 2022

(54) METHOD FOR MANUFACTURING SENSOR ELEMENT

(71) Applicant: NGK SPARK PLUG CO., LTD., Nagoya (JP)

(72) Inventors: Satoshi Okazaki, Nagoya (JP); Masaki Mizutani, Nagoya (JP); Ai Igarashi, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 360 days.

(21) Appl. No.: 16/807,289

(22) Filed: Mar. 3, 2020

(65) Prior Publication Data
US 2020/0331809 A1 Oct. 22, 2020

(30) Foreign Application Priority Data
Apr. 16, 2019 (JP) .............................. JP2019-077538

(51) Int. Cl.
C04B 35/64 (2006.01)
G01N 27/407 (2006.01)
G01N 27/409 (2006.01)
C04B 37/00 (2006.01)

(52) U.S. Cl.
CPC ............ C04B 35/64 (2013.01); C04B 37/005 (2013.01); G01N 27/409 (2013.01); G01N 27/4071 (2013.01); G01N 27/4077 (2013.01); *C04B 2237/704* (2013.01); *C04B 2237/708* (2013.01)

(58) Field of Classification Search
None
See application file for complete search history.

(56) References Cited

U.S. PATENT DOCUMENTS

| | | | | |
|---|---|---|---|---|
| 10,876,991 B2* | 12/2020 | Shimizu | ............... | G01N 27/407 |
| 2008/0016947 A1* | 1/2008 | Mizutani | ............ | G01N 27/4071 |
| | | | | 29/729 |
| 2015/0192545 A1* | 7/2015 | Sugiyama | .............. | G01N 27/70 |
| | | | | 73/28.01 |
| 2015/0355142 A1* | 12/2015 | Murakami | ......... | G01N 27/4077 |
| | | | | 324/464 |
| 2018/0284054 A1* | 10/2018 | Hino | ...................... | G01N 27/41 |
| 2018/0284055 A1* | 10/2018 | Hino | ...................... | G01N 27/41 |

FOREIGN PATENT DOCUMENTS

JP  2003-344351 A  12/2003

\* cited by examiner

*Primary Examiner* — John J Figueroa
(74) *Attorney, Agent, or Firm* — Leason Ellis LLP; Melvin C. Garner; Mitsuhiro Haraguchi

(57) ABSTRACT

A method for manufacturing a sensor element that includes: a pair of electrodes; a ceramic layer having a hollow space that is to be an air introduction hole; and a first layer and a second layer stacked at both surfaces of the ceramic layer, One of the electrodes is in communication with the hollow space, The method includes: preparing an unsintered ceramic sheet, and a burn-out material sheet having a thickness different from that of the unsintered ceramic sheet, the burn-out material sheet having, in a plane orthogonal to the direction of an axial line O, a cross-sectional area substantially identical to a cross-sectional area of the pre-sintering hollow space; placing the burn-out material sheet in the pre-sintering hollow space; pressing the sheets so as to have an identical thickness; and burning out the burn-out material sheet.

4 Claims, 9 Drawing Sheets

METHOD FOR MANUFACTURING SENSOR ELEMENT

This application claims the benefit of priority to Japanese Patent Application No. 2019-077538, filed Apr. 16, 2019, which is incorporated herein by reference in its entirety.

FIELD OF THE INVENTION

The present invention relates to a method for manufacturing a sensor element that has a hollow space to be an air introduction hole and that is suitably used for detecting the concentration of a specific gas contained in combustion gas or exhaust gas from combustors, internal combustion engines, etc., for example.

BACKGROUND OF THE INVENTION

To date, a gas sensor for detecting the concentration of a specific component (e.g., oxygen) in exhaust gas from an internal combustion engine has been used. As for the gas sensor, a configuration is known in which: the gas sensor includes a sensor element; the sensor element has a plate shape obtained by stacking a plurality of ceramic layers and has a pair of electrodes disposed at a solid electrolyte; and a reference electrode of the pair of electrodes faces an air introduction hole serving as a hollow space inside the sensor element (see Japanese Patent Application Laid-Open (kokai) No. 2003-344351 (FIG. 2)).

Meanwhile, the air introduction hole which is the hollow space inside the sensor element can be formed as shown in FIG. 10. First, an unsintered ceramic sheet 1010$x$ having a hollow space in an U-shape that is open to one end in a direction of an axial line O of the sensor element is stacked on an unsintered insulation layer 1020$x$ that is to be a base. Thereafter, a burn-out-type paste 1100$x$ is printed and filled in the hollow space of the unsintered ceramic sheet 1010$x$, then, another unsintered layer 1030$x$ is stacked on the unsintered ceramic sheet 1010$x$, and then, the entirety of the resultant article is sintered. As a result, the burn-out-type paste 1100$x$ is burnt out, and the hollow space of the ceramic sheet 1010 becomes an air introduction hole.

Problems to be Solved by the Invention

However, there is a limitation for the thickness by which the burn-out-type paste 1100$x$ can be printed at one time. Thus, it is difficult to sufficiently fill the burn-out-type paste 1100$x$ in the hollow space of the unsintered ceramic sheet 1010$x$. In addition, multiple applications of the burn-out-type paste 1100$x$ could cause displacement of the printing position, or the like. This results in a smaller thickness of the burn-out-type paste 1100$x$ than that of the hollow space of the unsintered ceramic sheet 1010$x$.

In this case, as shown in FIG. 11, during stacking or sintering of the layers 1020, 1010, 1030, the layer 1030 above an air introduction hole 1010$h$ serving as the hollow space of the layer 1010 is sometimes not supported by the burn-out-type paste 1100$x$ and deformed in the thickness direction, thus causing a reduced cross section of the air introduction hole 1010$h$. When the cross-sectional area of the air introduction hole 1010$h$ is changed, the amount of oxygen to be supplied to the reference electrode is also changed. This results in unstable characteristics of the sensor.

Since the cross-sectional area of the air introduction hole influences the characteristics of the sensor, a technique for forming an accurate air introduction hole having a desired cross-sectional area is required.

Therefore, an object of the present invention is to provide a method for manufacturing a sensor element in which the shape of a hollow space faced by an electrode of the sensor element is maintained to be constant, thereby stabilizing the characteristics of the sensor.

SUMMARY OF THE INVENTION

Means for Solving the Problems

In order to solve the above problem, a method for manufacturing a sensor element of the present invention is for manufacturing a sensor element extending in a direction of an axial line, having a plate shape, and including: a pair of electrodes; a ceramic layer having a hollow space that is to be an air introduction hole and that extends in the direction of the axial line; and a first layer and a second layer respectively stacked at both surfaces of the ceramic layer so as to cover the hollow space. One of the electrodes is in communication with the hollow space. The method includes: a preparation step of preparing an unsintered ceramic sheet to be the ceramic layer after sintering, the unsintered ceramic sheet having a pre-sintering hollow space in a portion corresponding to the hollow space, and a burn-out material sheet having smaller dimensions than the pre-sintering hollow space when viewed in a plane direction of the unsintered ceramic sheet, the burn-out material sheet having a thickness different from that of the unsintered ceramic sheet, the burn-out material sheet having, in a plane orthogonal to the direction of the axial line, a cross-sectional area substantially identical to a cross-sectional area of the pre-sintering hollow space; a placement step of placing the burn-out material sheet in the pre-sintering hollow space of the unsintered ceramic sheet; a pressing step of, after the placement step, pressing the unsintered ceramic sheet and the burn-out material sheet so as to have an identical thickness; and a sintering step of, after the pressing step, sintering the unsintered ceramic sheet and the burn-out material sheet to burn out the burn-out material sheet and make the unsintered ceramic sheet into the ceramic layer, thereby forming the hollow space.

According to the method for manufacturing the sensor element, the cross-sectional area of the burn-out material sheet is substantially identical to the cross-sectional area of the pre-sintering hollow space (the difference between the cross-sectional areas is within ±25%). Therefore, at the time point when the thicknesses have become identical to each other in the pressing step, the burn-out material sheet is tightly filled in the pre-sintering hollow space without leaving voids therein. As a result, during the subsequent sintering, the layers above and below the burn-out material sheet are inhibited from being deformed in the thickness direction and narrowing the air introduction hole. Accordingly, the shape of the air introduction hole is maintained to be constant, whereby the characteristics of the sensor can be stabilized.

In addition, since the burn-out material sheet is tightly filled in the pre-sintering hollow space without leaving voids therein, the burn-out material sheet is inhibited from falling off from the unsintered ceramic sheet after the pressing step. Thus, the handleability when the unsintered ceramic sheet (and the burn-out material sheet) is stacked and sintered with other layers is also excellent.

Further, in a case where a burn-out material paste is filled in the pre-sintering hollow space, even if the burn-out material paste is successfully filled to the same height as the pre-sintering hollow space, there is no method for confirming whether the burn-out material paste is filled up to the four corners of the pre-sintering hollow space without leaving voids therein. Thus, it is difficult to fill the burn-out material in a stable manner. In contrast, in the present embodiment, since the burn-out material sheet having a cross-sectional area substantially identical to that of the pre-sintering hollow space is placed and pressed as described above, the burn-out material can be assuredly filled up to the four corners of the pre-sintering hollow space. Thus, an air introduction hole having a desired cross-sectional area can be assuredly obtained.

In the method for manufacturing the sensor element of the present invention, a periphery of the pre-sintering hollow space may be closed by the unsintered ceramic sheet.

According to the method for manufacturing the sensor element, the periphery of the pre-sintering hollow space is closed by the unsintered ceramic sheet, and the pre-sintering hollow space does not have an opening. Therefore, even if the opening is not closed by a retaining mold or the like in the pressing step, the material of the burn-out material sheet does not flow to the outside.

In the method for manufacturing the sensor element of the present invention, a front end or a rear end in the direction of the axial line of the pre-sintering hollow space may have an opening, and an end, of the burn-out material sheet, directed to the opening may be closed in the pressing step.

According to the method for manufacturing the sensor element, reference air is easily allowed to flow through the opening into the hollow space that is to be the air introduction hole.

Since the burn-out material sheet is pressed while being closed by the retaining mold or the like, the material of the burn-out material sheet is inhibited from flowing to the outside through the opening under the pressure of the pressing. Thus, the burn-out material sheet can be filled further tightly in the pre-sintering hollow space without leaving voids therein.

In the method for manufacturing the sensor element of the present invention, after the pressing step, in a plane orthogonal to the direction of the axial line, the cross-sectional area of the pre-sintering hollow space and the cross-sectional area of the burn-out material sheet may be substantially identical to each other.

In the method for manufacturing the sensor element of the present invention, since the cross-sectional area of the burn-out material sheet and the cross-sectional area of the pre-sintering hollow space are substantially identical to each other (the difference between the cross-sectional areas is within ±25%) as described above, the cross-sectional areas are substantially identical to each other (the difference between the cross-sectional areas is within ±5%) also after the pressing step.

Effects of the Invention

According to the present invention, the shape of the hollow space faced by an electrode of the sensor element is maintained to be constant, whereby the characteristics of the sensor can be stabilized.

DETAILED DESCRIPTION OF THE INVENTION

Hereinafter, embodiments of the present invention will be described.

Figure 1:
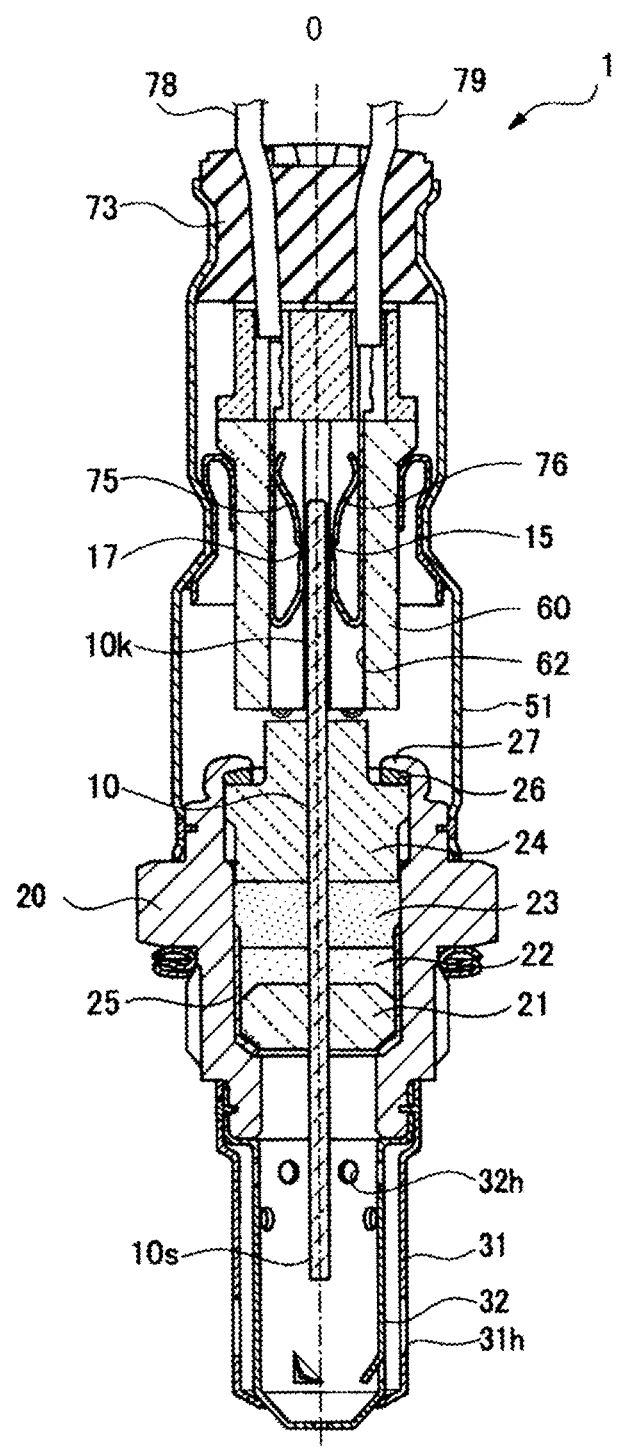
FIG. 1 is across-sectional view along a direction of an axial line of a gas sensor (oxygen sensor) that includes a sensor element manufactured by a method for manufacturing a sensor element according to an embodiment of the present invention.
Figure 2:
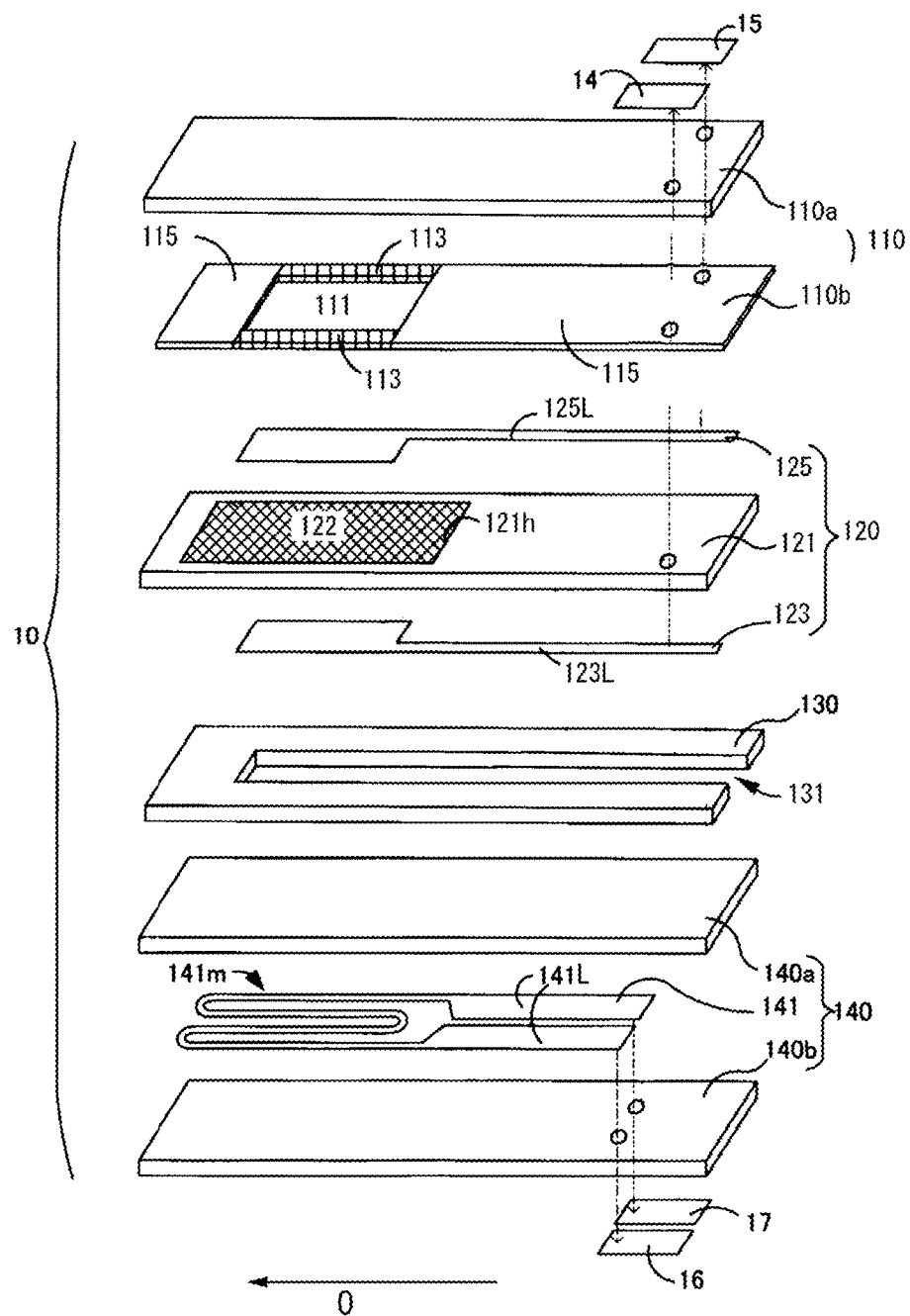
FIG. 2 is a schematic exploded perspective view of the sensor element.

FIG. 1 is a cross-sectional view along a direction of an axial line O of a gas sensor (oxygen sensor) 1 that includes a sensor element 10 manufactured by a method for manufacturing a sensor element according to a first embodiment of the present invention. FIG. 2 is a schematic exploded perspective view of the sensor element 10.

The gas sensor 1 includes the sensor element 10 and a metal shell 20 as major components. The sensor element 10 is a long plate-shaped element, and includes a sensor cell for measuring the oxygen concentration in an exhaust gas, which is a measurement target gas. The sensor element 10 includes: a front end portion 10s in which the sensor cell is disposed; and a rear end portion 10k in which sensor-side electrode pad portions 14, 15 (only 15 is shown) electrically connected to lead wires 78, 79 are disposed. The sensor element 10 is held by the metal shell 20 such that the front end portion 10s projects relative to the front side of the metal shell 20 and the rear end portion 10k projects relative to the rear side of the metal shell 20.

The metal shell 20 has a tubular shape in which the sensor element 10 is held. On the front side of the metal shell 20, an external protector 31 and an internal protector 32 each made of metal and having a tubular shape are disposed so as to cover the front end portion 10s of the sensor element 10. The external protector 31 and the internal protector 32 each have a plurality of gas introduction holes 31h, 32h, and introduce the measurement target gas through the gas introduction holes 31h, 32h to a space around the front end portion 10s of the sensor element 10.

In the metal shell 20, an annular ceramic holder 21, powder-filled layers (hereinafter, also referred to as talc ring) 22, 23, and a ceramic sleeve 24, which surround the outer periphery of the sensor element 10, are disposed in this order from the front side. A metal holder 25 is disposed on the outer peripheries of the ceramic holder 21 and the talc ring 22, and a crimping packing 26 is disposed on the rear side of the ceramic sleeve 24. A rear end portion 27 of the metal shell 20 is crimped via the crimping packing 26 so as to press the ceramic sleeve 24 toward the front side.

On the rear side of the metal shell 20, a tubular outer casing 51 is disposed so as to surround the rear end portion 10k of the sensor element 10. A separator 60 is disposed inside the outer casing 51. The separator 60 surrounds the rear end portion 10k of the sensor element 10 and holds four lead wires 78, 79 (only two of them are shown in FIG. 1) so as to be separated from each other.

The separator 60 has an insertion hole 62 penetrating the separator 60 in the direction of the axial line O. The rear end portion 10k of the sensor element 10 is inserted in the insertion hole 62. In the insertion hole 62, four terminal members 75, 76 are disposed so as to be separated from each other, and are electrically connected to the sensor-side electrode pad portions 14, 15 and two heater-side electrode pad portions 16, 17 (only 17 is shown) of the sensor element 10, respectively.

Meanwhile, on the rear side of the outer casing 51, a grommet 73 that closes a rear-end opening of the outer casing 51 is fitted, and the four lead wires 78, 79 penetrate insertion holes of the grommet 73 to be drawn to the outside. The rear end portion 10k of the sensor element 10 and external air are in communication with each other through a communication path that is not shown.

Next, with reference to FIG. 2, a configuration of the sensor element 10 is described.

The sensor element 10 is formed by stacking, in the thickness direction (stacking direction), a first ceramic layer 110, a second ceramic layer 120, a third ceramic layer 130, and a heater layer 140, from the top in FIG. 2 in this order. The layers 110 to 140 are each made from an insulating ceramic such as alumina, and are in rectangular plate shapes having the same external dimensions (in width and length, at least).

The first ceramic layer 110 is formed by stacking a protection layer 110a and a measurement chamber layer 110b. On the front side (the left side in FIG. 2) of the measurement chamber layer 110b, a measurement chamber 111 is open in a rectangular shape. Porous diffusion layers 113 that define the measurement chamber 111 with respect to the outside are disposed on both side faces at the long sides of the measurement chamber layer 110b. Meanwhile, ceramic insulation layers 115 serving as side walls of the measurement chamber 111 are disposed on the front side and the rear side of the measurement chamber 111.

The measurement chamber 111 is in communication with the outside via the porous diffusion layers 113. The porous diffusion layers 113 realize gas diffusion between the outside and the measurement chamber 111 under a predetermined rate controlling condition. Thus, the sensor element 10 forms a sensor element of a limiting current type. The respective porous diffusion layers 113 face the outside, while forming both side walls along the longitudinal direction (the direction of the axial line O) of the sensor element 10.

The second ceramic layer 120 includes: a cell layer 121 including a solid electrolyte 122 having a rectangular plate shape; and a reference gas-side electrode 123 and a measurement target gas-side electrode 125 respectively provided at the upper and under surfaces of the solid electrolyte 122. A penetration portion 121h that is open in a rectangular shape is provided on the front side (the left side in FIG. 2) of the cell layer 121. The solid electrolyte 122 is disposed so as to be embedded in the penetration portion 121h. Lead portions 123L, 125L extend rearward from the reference gas-side electrode 123 and the measurement target gas-side electrode 125, respectively.

The solid electrolyte 122, the reference gas-side electrode 123, and the measurement target gas-side electrode 125 form a detection cell for the oxygen concentration in the measurement target gas. The measurement target gas-side electrode 125 faces the measurement chamber 111. The reference gas-side electrode 123 faces (is in communication with) an air introduction hole (hollow space) 131 described later.

The lead portion 123L is electrically connected to the sensor-side electrode pad portion 14 via through-holes provided in the cell layer 121, the measurement chamber layer 110b, and the protection layer 110a. In addition, the lead portion 125L is electrically connected to the sensor-side electrode pad portion 15 via through-holes provided in the measurement chamber layer 110b and the protection layer 110a.

Detection signals of the reference gas-side electrode 123 and the measurement target gas-side electrode 125 are outputted to the outside from the sensor-side electrode pad portions 14, 15 via the two lead wires 79, whereby the oxygen concentration is detected.

The third ceramic layer 130 is a frame body in a U-shape in a plan view in which the air introduction hole 131 is open from the front side (the left side in FIG. 2) toward the rear side. Thus, the air introduction hole 131 is open at the face on the rear side (the face on the right side in FIG. 2) and is in communication with the outside.

The heater layer 140 includes a first layer 140a, a second layer 140b, and a heating element 141 disposed between the first layer 140a and the second layer 140b. The first layer 140a is opposed to the third ceramic layer 130. The heating element 141 includes a heat generation portion 141m having a meandering pattern, and two lead portions 141L extending rearward from both ends of the heat generation portion 141m.

The respective lead portions 141L are electrically connected to the heater-side electrode pad portions 16, 17 via through-holes provided in the second layer 140b. When electricity is applied from the heater-side electrode pad portions 16, 17 to the heating element 141 via the two lead wires 78, the heating element 141 generates heat, thereby activating the solid electrolyte 122.

The solid electrolyte 122 can be formed from a partially stabilized zirconia sintered body obtained by adding yttria ($Y_2O_3$) or calcia (CaO) as a stabilizer to zirconia ($ZrO_2$), for example.

The reference gas-side electrode 123, the measurement target gas-side electrode 125, the heating element 141, the sensor-side electrode pad portions 14, 15, and the heater-side electrode pad portions 16, 17 can be formed from elements of the platinum group. Examples of suitable elements of the platinum group for forming these components include Pt, Rh, Pd, and the like. One type of these can be used individually, or two or more types of these may be used in combination.

Here, the third ceramic layer 130 corresponds to a "ceramic layer" in the claims. The second ceramic layer 120 and the heater layer 140 correspond to a "first layer" and a "second layer" in the claims, respectively. The reference gas-side electrode 123 and the measurement target gas-side electrode 125 correspond to a "pair of electrodes" in the claims, and the reference gas-side electrode 123 of these electrodes corresponds to "one of electrodes".

It should be noted that the "ceramic layer" denotes a layer in which the total proportion of ceramic among the components of the layer exceeds 50% by mass.

Figure 3A:
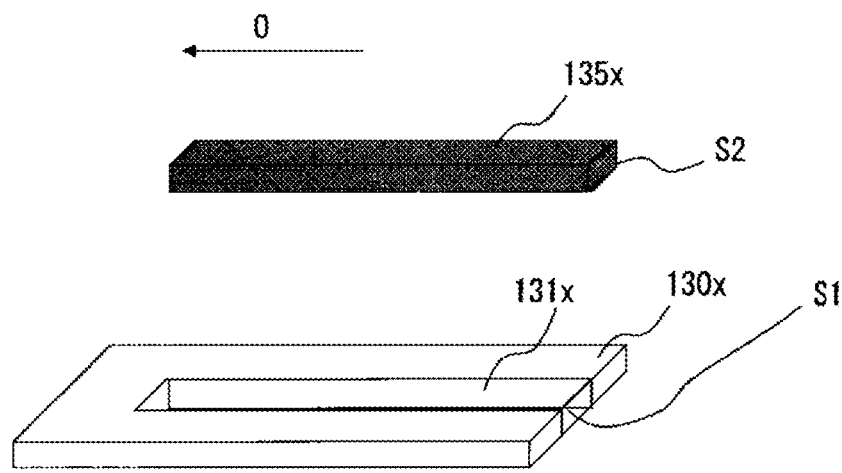
FIG. 3A is a view illustrating the process of a preparation step.
Figure 3B:
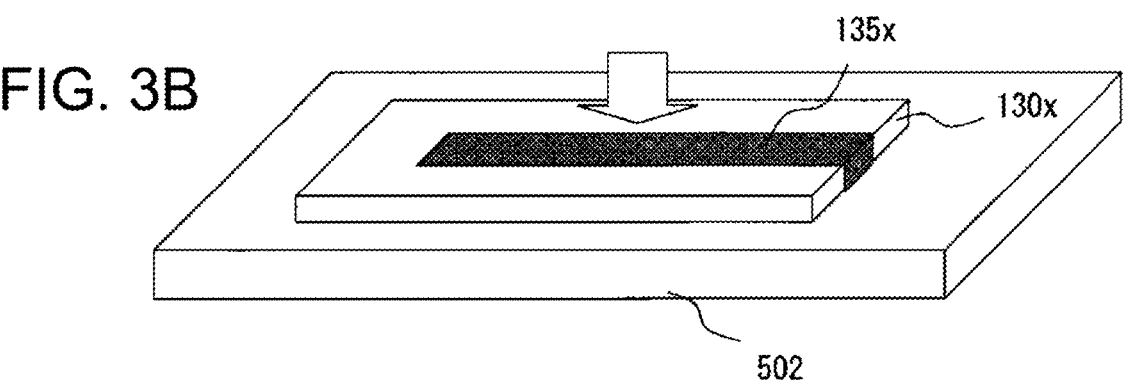
FIG. 3B is a view illustrating the process of a placement step.
Figure 4A:
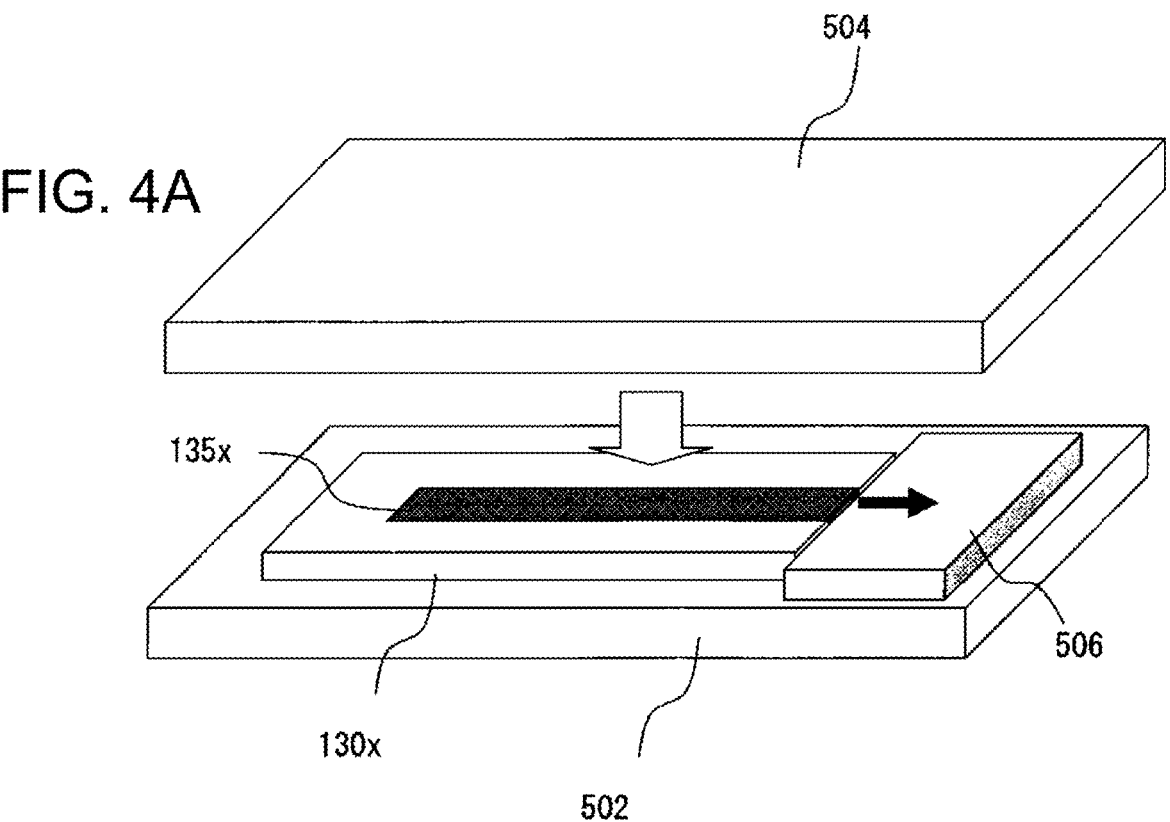
FIG. 4A is a view illustrating the process of a pressing step.
Figure 4B:
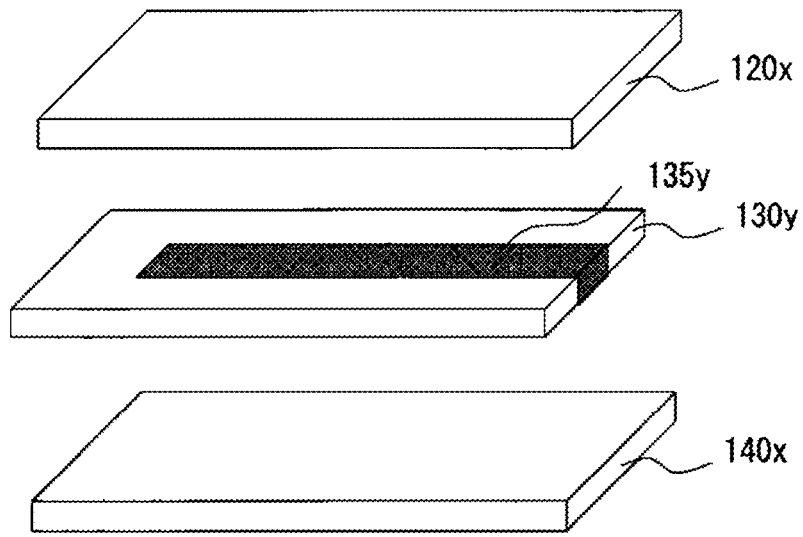
FIG. 4B is a view illustrating the process of a sintering step.
Figure 5A:
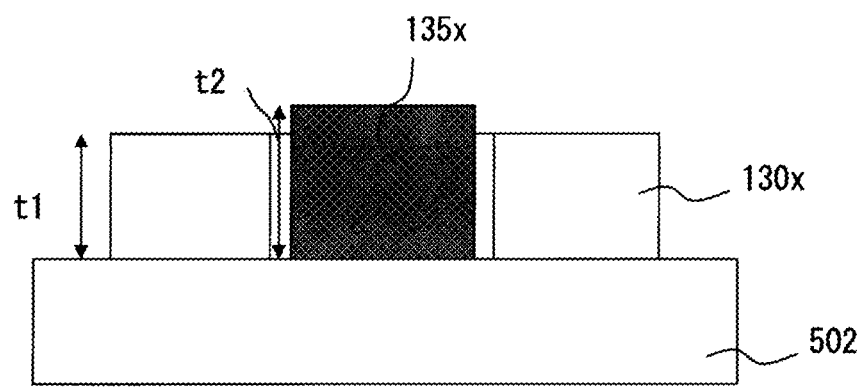
FIG. 5A is a view showing change in the thickness of an unsintered ceramic sheet and a burn-out material sheet in the pressing step.
Figure 5B:
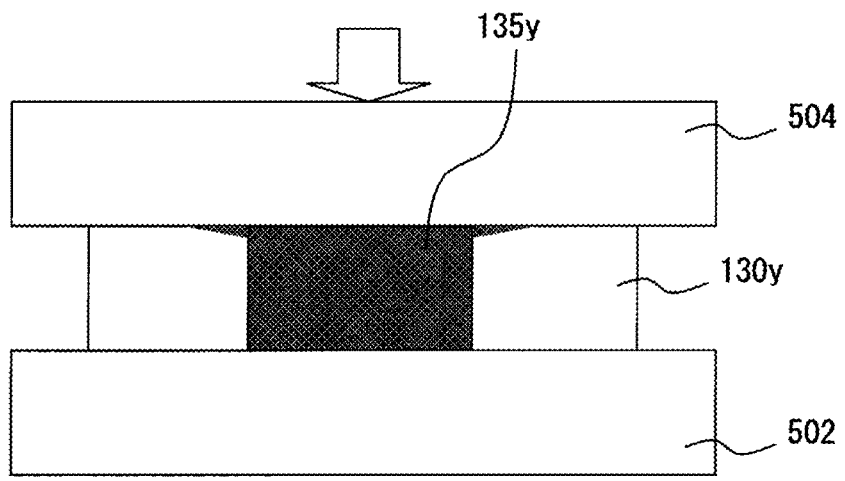
FIG. 5B is a view showing change in the thickness of an unsintered ceramic sheet and a burn-out material sheet in the pressing step.

Next, with reference to FIGS. 3A and 3B to FIGS. 5A and 5B, a method for manufacturing the sensor element according to the first embodiment of the present invention is described. FIGS. 3A and 3B are views illustrating the processes of a preparation step and a placement step. FIGS. 4A and 4B are views illustrating the processes of a pressing step and a sintering step. FIGS. 5A and 5B are views showing change in the thickness of an unsintered ceramic sheet and a burn-out material sheet in the pressing step.

First, as shown in FIG. 3A, a burn-out material sheet 135$x$, and an unsintered ceramic sheet 130$x$, which is to be the third ceramic layer 130 after sintering and of which a portion corresponding to the air introduction hole (hollow space) 131 is removed to form a pre-sintering hollow space 131$x$, are prepared (preparation step). The burn-out material sheet 135$x$ can be formed from a burn-out-type carbon paste (carbon particles and an organic resin paste agent) or the like.

The unsintered ceramic sheet 130$x$ is a frame body in a U-shape in a plan view in which the pre-sintering hollow space 131$x$ is open from the front side (the left side in FIGS. 3A and 3B) toward the rear side.

The burn-out material sheet 135$x$ has smaller dimensions than the pre-sintering hollow space 131$x$ when viewed in the plane direction of the unsintered ceramic sheet 130$x$, such that the burn-out material sheet 135$x$ can be accommodated in the pre-sintering hollow space 131$x$. In addition, the burn-out material sheet 135$x$ has a thickness different from that of the unsintered ceramic sheet 130$x$, and in a plane orthogonal to the direction of the axial line O, a cross-sectional area S2 of the burn-out material sheet 135$x$ is substantially identical to a cross-sectional area S1 of the pre-sintering hollow space 131$x$ (the difference between the cross-sectional areas is within ±25%).

Next, as shown in FIG. 3B, for example, on a base 502, the burn-out material sheet 135$x$ is accommodated (placed) in the pre-sintering hollow space 131$x$ of the unsintered ceramic sheet 130$x$ (placement step).

Next, as shown in FIG. 4A, for example, an upper mold 504 is pressed toward the base 502 from above the unsintered ceramic sheet 130$x$ and the burn-out material sheet 135$x$, so that the unsintered ceramic sheet 130$x$ and the burn-out material sheet 135$x$ are pressed so as to have an identical thickness (pressing step).

Then, as shown in FIG. 4B, an unsintered ceramic sheet 130$y$, in which the pressed burn-out material sheet 135$y$ is placed, is removed from the base 502 and then stacked with other layers 120$x$, 140$x$ (unsintered sheets of the second ceramic layer 120 and the heater layer 140 in FIG. 2), and then, the entirety of the stacked body is sintered, whereby the burn-out material sheet 135$x$ is burnt out, and the unsintered ceramic sheet 130$x$ is made into the third ceramic layer 130 to form the air introduction hole (hollow space) 131 (sintering step).

It should be noted the unsintered ceramic sheet, the pre-sintering hollow space, and the burn-out material sheet before and after the pressing are differentiated by adding "x" and "y" to the reference numerals.

Here, as shown in FIG. 5A, a thickness t2 of the burn-out material sheet 135$x$ before the pressing is greater than a thickness t1 of the unsintered ceramic sheet 130$x$. Through the pressing step shown in FIG. 5B, the thicknesses of the burn-out material sheet 135$y$ and the unsintered ceramic sheet 130$y$ become identical to each other.

At this time, the cross-sectional area S2 of the burn-out material sheet 135$x$ before the pressing is substantially identical to the cross-sectional area S1 of the pre-sintering hollow space 131$x$. Thus, at the time point when the thicknesses have become identical to each other, the burn-out material sheet 135$y$ is tightly filled in a pre-sintering hollow space 131$y$ without leaving voids therein. As a result, during the subsequent sintering, the layers above and below the burn-out material sheet 135$y$ are inhibited from deforming in the thickness direction and narrowing the air introduction hole 131. Accordingly, the shape of the air introduction hole 131 can be maintained to be constant, whereby the characteristics of the sensor can be stabilized, and an air introduction hole having a desired cross-sectional area can be assuredly obtained.

In addition, since the burn-out material sheet 135$y$ is tightly filled in the pre-sintering hollow space 131$y$ without leaving voids therein, the burn-out material sheet 135$y$ is inhibited from falling off from the unsintered ceramic sheet 130$y$ after the pressing step. Thus, as shown in FIG. 4B, the handleability when the unsintered ceramic sheet 130$y$ (and the burn-out material sheet 135$y$) is stacked and sintered with other layers 120$x$, 140$x$ is also excellent.

Further, in a case where a burn-out material paste is filled in the pre-sintering hollow space 131$x$ as in the conventional art, even if the burn-out material paste is successfully filled to the same height as the pre-sintering hollow space 131$x$, there is no method for confirming whether the burn-out material paste is filled up to the four corners of the pre-sintering hollow space 131$x$ without leaving voids therein. Thus, it is difficult to fill the burn-out material in a stable manner. In contrast, in the present embodiment, since the burn-out material sheet 135$x$ having a cross-sectional area substantially identical to that of the pre-sintering hollow space 131$x$ is placed and pressed as described above, the burn-out material can be assuredly filled up to the four corners of the pre-sintering hollow space 131$y$.

Since the cross-sectional area S2 of the burn-out material sheet 135$x$ before the pressing is substantially identical (the difference between the cross-sectional areas is within ±25%) to the cross-sectional area S1 of the pre-sintering hollow space 131$x$ as described above, the cross-sectional areas of both are substantially identical to each other (the difference between the cross-sectional areas is within ±5%) also after the pressing step, and the burn-out material sheet 135$y$ is tightly filled in the pre-sintering hollow space 131$y$ without leaving voids therein.

If S2 and S1 are not substantially identical to each other and in the case of S2>S1, the thickness of the burn-out material sheet 135$x$ is excessively greater than the thickness of the unsintered ceramic sheet 130$x$. Then, in the pressing step, the amount of the material of the burn-out material sheet 135$x$ is too excessive as compared to the amount of the material required for filling the pre-sintering hollow space 131x, which causes a problem that the material of the burn-out material sheet 135x extends onto the upper and lower surfaces of the unsintered ceramic sheet 130x, for example.

In the reverse, in the case of S1>S2, in the pressing step, the amount of the material of the unsintered ceramic sheet 130x is too excessive, which causes a problem that the material of the unsintered ceramic sheet 130x extends onto the upper and lower surfaces of the burn-out material sheet 135x, for example.

In the pressing step shown in FIG. 4A, when the pressing is performed while the end, of the burn-out material sheet 135x, directed to the opening of the pre-sintering hollow space 131x (the right side in FIG. 4A) is closed (retained) by a retaining mold 506 or the like, the material of the burn-out material sheet 135y is inhibited from flowing to the outside through the opening under the pressure of the pressing, and thus, the burn-out material sheet 135y can be filled further tightly in the pre-sintering hollow space 131y without leaving voids therein.

Figure 6:
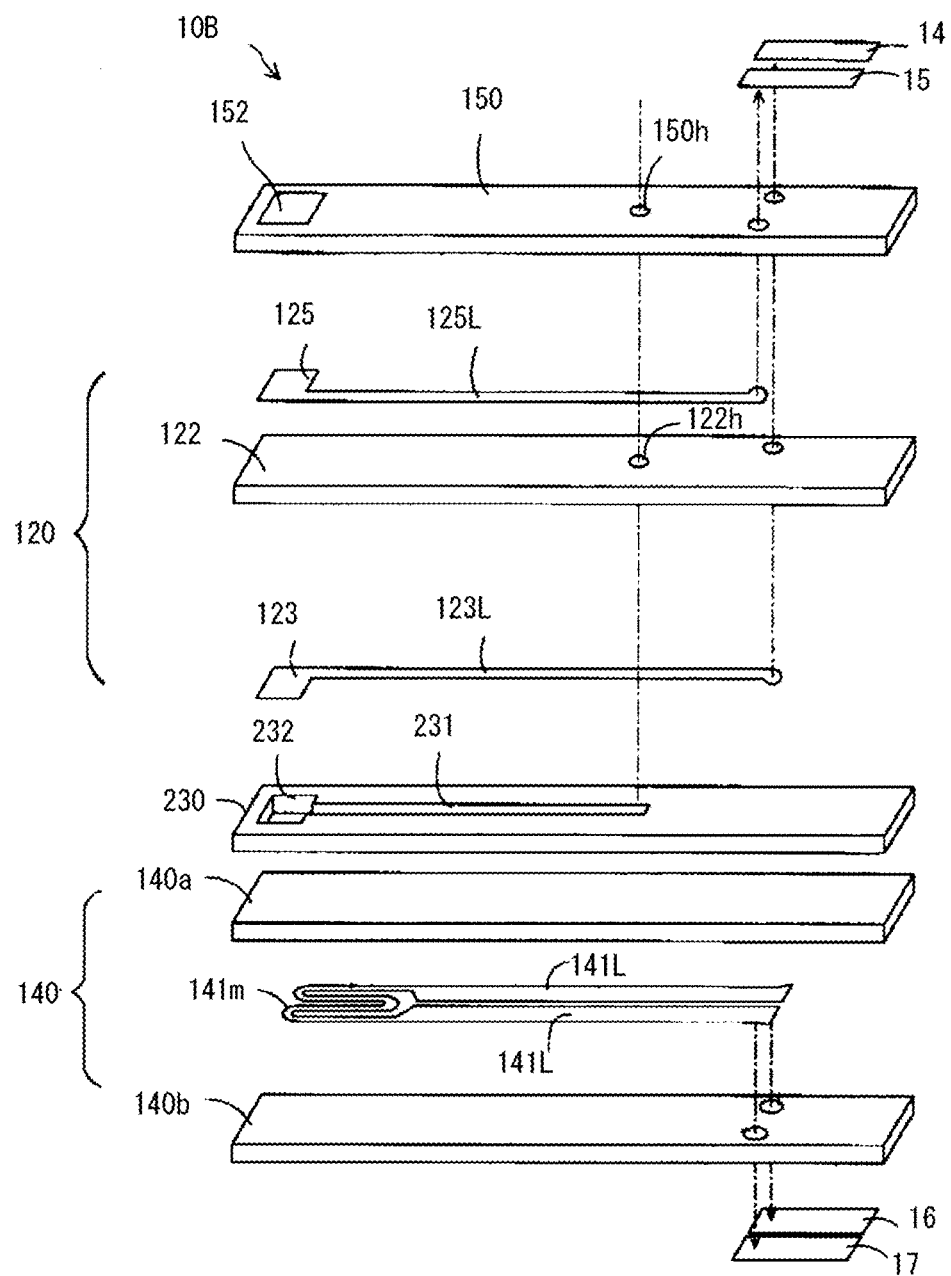
FIG. 6 is a schematic exploded perspective view of a sensor element manufactured by a method for manufacturing a sensor element according to a second embodiment of the present invention.

Next, a method for manufacturing a sensor element according to a second embodiment of the present invention is described. First, a configuration of a sensor element 10B manufactured by a method for manufacturing a sensor element according to the second embodiment of the present invention is described with reference to FIG. 6. FIG. 6 is a schematic exploded perspective view of the sensor element 10B. In FIG. 6, the same components as those of the sensor element 10 according to the first embodiment are denoted by the same reference numerals as in FIG. 2 and description thereof is omitted. Here, for example, the measurement target gas-side electrode 125 in FIG. 2 and the measurement target gas-side electrode 125 in FIG. 6 are considered as the same component because they have the same function although they have slightly different shapes.

In the sensor element 10B shown in FIG. 6, as for a third ceramic layer 230, an air introduction hole 231 extends in the direction of the axial line O, but has the periphery thereof closed by the third ceramic layer 230 and does not have an opening. At the front side (the left side in FIG. 6) of the air introduction hole 231, a rectangular portion 232 is formed that is opposed to the reference gas-side electrode 123 and that has slightly smaller dimensions than the reference gas-side electrode 123. The rectangular portion 232 is wider than the air introduction hole 231.

The rectangular portion 232 is in communication with the air introduction hole 231. In the present invention, as long as the rectangular portion 232 is, as a hollow space, in communication with the air introduction hole 231, the rectangular portion 232 is considered as a part of the air introduction hole 231.

In the sensor element 10B, the solid electrolyte 122 forming the second ceramic layer 120 is not a type that is embedded in the cell layer 121 as in the sensor element 10 shown in FIG. 2, but is a single layer having identical dimensions, in a plan view, to the dimensions of the sensor element 10B.

The sensor element 10B does not include the measurement chamber 111 as in the sensor element 10 in FIG. 2. In the sensor element 10B, the surface, at the side opposite to the solid electrolyte 122, of the measurement target gas-side electrode 125 is covered by a porous protection layer 152, and the external measurement target gas flows through the porous protection layer 152 to the measurement target gas-side electrode 125. The protection layer 152 is embedded in an insulation layer 150 having a rectangular hole, and the insulation layer 150 covers the second ceramic layer 120.

Here, in the sensor element 10B, the periphery of the air introduction hole 231 (and the rectangular portion 232) is closed by the third ceramic layer 230. In addition, in the solid electrolyte 122 and the insulation layer 150 that overlap a rear end portion (the right side in FIG. 6) of the air introduction hole 231 in the stacking direction, through-holes 122h, 150h are respectively formed. Therefore, the air introduction hole 231 is in communication with the through-holes 122h, 150h, and reference air flows in the stacking direction into the air introduction hole 231 via the through-holes 122h, 150h.

Figure 7A:
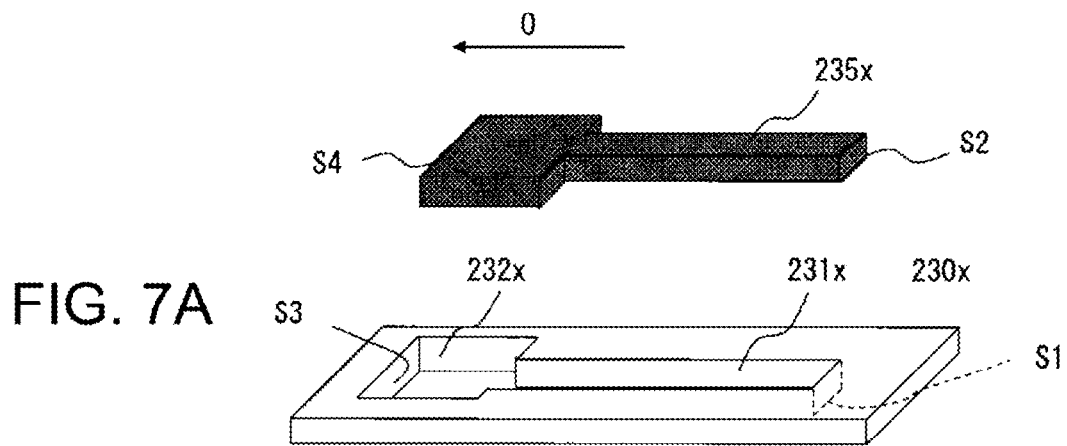
FIG. 7A is a view illustrating the process of a preparation step in the second embodiment.
Figure 7B:
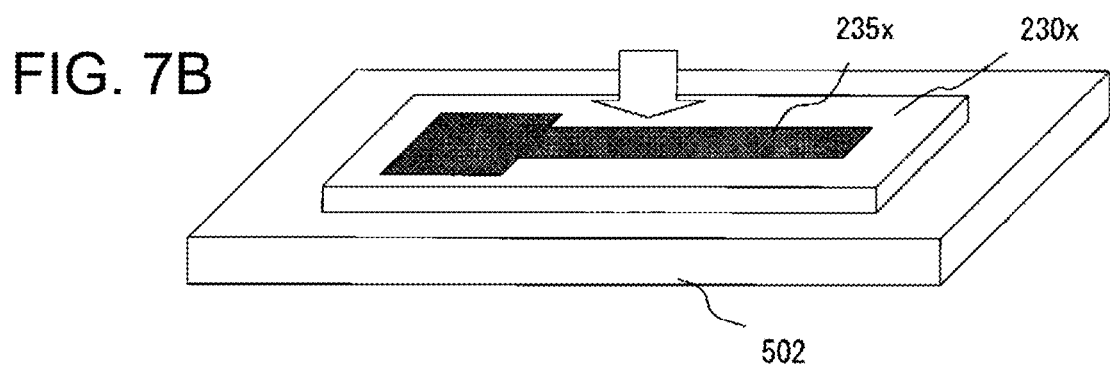
FIG. 7B is a view illustrating the process of a placement step in the second embodiment.

Next, with reference to FIGS. 7A and 7B, a method for manufacturing the sensor element according to the second embodiment of the present invention is described. FIGS. 7A and 7B are views illustrating the processes of a preparation step and a placement step.

First, as shown in FIG. 7A, a burn-out material sheet 235x, and an unsintered ceramic sheet 230x, which is to be the third ceramic layer 230 after sintering and of which a portion corresponding to the air introduction hole (hollow space) 231, 232 is removed to form a pre-sintering hollow space 231x, 232x, are prepared (preparation step).

The unsintered ceramic sheet 230x is a frame body in which: the pre-sintering hollow space 232x having a rectangular shape and the pre-sintering hollow space 231x having a strip shape and having a smaller width than the pre-sintering hollow space 232x are integrally formed from the front side (the left side in FIGS. 7A and 7B) toward the rear side; and the periphery of the integrally formed pre-sintering hollow space 231x, 232x is closed by the unsintered ceramic sheet 230x.

The burn-out material sheet 235x has smaller dimensions than the pre-sintering hollow space 231x, 232x when viewed in the plane direction of the unsintered ceramic sheet 230x, such that the burn-out material sheet 235x can be accommodated in the pre-sintering hollow space 231x, 232x. In addition, the burn-out material sheet 235x has a thickness different from that of the unsintered ceramic sheet 230x, and in a plane orthogonal to the direction of the axial line O, a cross-sectional area S2 on the rear side of the burn-out material sheet 235x is substantially identical to a cross-sectional area S1 of the pre-sintering hollow space 231x, and a cross-sectional area S4 on the front side of the burn-out material sheet 235x is substantially identical to a cross-sectional area S3 of the pre-sintering hollow space 232x.

It should be noted that "substantially identical" means that, similar to the first embodiment, the difference between the cross-sectional areas S1 and S2 is within ±25% and the difference between the cross-sectional areas S3 and S4 is within ±25%.

As shown in FIG. 7B, on the base 502, the burn-out material sheet 235x is placed in the pre-sintering hollow space 231x of the unsintered ceramic sheet 230x. Then, although not shown, also in the second embodiment, as in FIGS. 4A and 4B and FIGS. 5A and 5B, the pressing step is performed, whereby the thickness of the burn-out material sheet 235x and the thickness of the unsintered ceramic sheet 230x become identical to each other. Since the cross-sectional area S2 of the burn-out material sheet 235x is substantially identical to the cross-sectional area S1 of the pre-sintering hollow space 231x, and the cross-sectional area S4 of the burn-out material sheet 235x is substantially identical to the cross-sectional area S3 of the pre-sintering hollow space 232x, the burn-out material sheet 235x is tightly filled in the pre-sintering hollow space 231x, 232x without leaving voids therein, and the shape of the air introduction hole 231 (232) is maintained to be constant, whereby the characteristics of the sensor can be stabilized.

Then, the sintering step may be performed in the same manner as in the first embodiment.

In the second embodiment, the periphery of the pre-sintering hollow space 231x, 232x is closed by the unsintered ceramic sheet 230x, and the pre-sintering hollow space 231x, 232x does not have an opening. Therefore, without having to be retained by the retaining mold 506 as in FIG. 4A in the pressing step, the material of the burn-out material sheet 235x does not flow to the outside.

"Substantially identical" after the pressing step means that, similar to the first embodiment, the difference between the cross-sectional areas S1 and S2 after the pressing is within ±5% and the difference between the cross-sectional areas S3 and S4 after the pressing is within ±5%.

Figure 8:
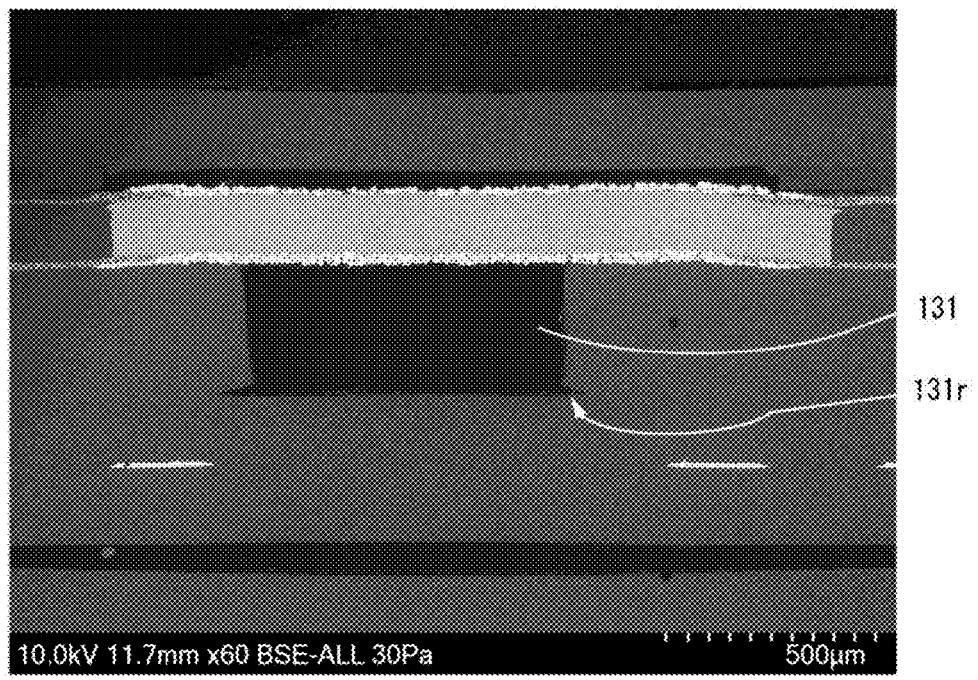
FIG. 8 is a view of a micrograph cross section, taken along a plane perpendicular to the direction of the axial line, of an actual sensor element according to the first embodiment.

FIG. 8 shows a micrograph of a cross section, taken along a plane perpendicular to the direction of the axial line O, of an actual sensor element 10 according to the first embodiment shown in FIG. 2. It is seen that the shape of the air introduction hole 131 is maintained to be constant, without the air introduction hole 131 being deformed.

On the lower side of the air introduction hole 131 shown in FIG. 8, recessed portions 131r extending outward from the air introduction hole 131 are formed at both side faces. This is considered to be caused by the burn-out material sheet 135x having slightly flowed into the lower side of the unsintered ceramic sheet 130x, as shown in FIG. 5B.

However, the cross-sectional area of each recessed portion 131r is small enough to be ignored when compared with the cross-sectional area of the air introduction hole 131, and thus, would not influence the cross-sectional area (shape) of the air introduction hole 131.

Figure 9:
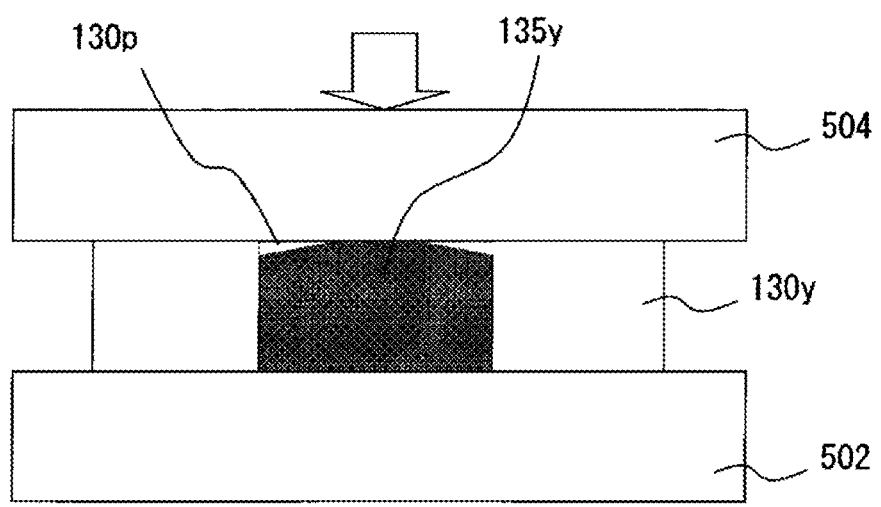
FIG. 9 is a view illustrating a case where upper side portions of the unsintered ceramic sheet slightly flow to above the burn-out material sheet in the pressing step.
Figure 10:
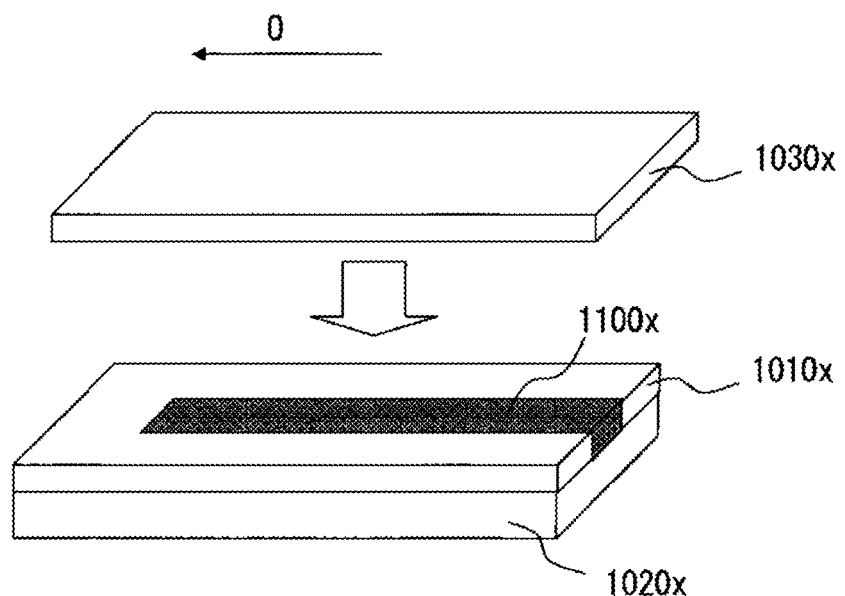
FIG. 10 is a view illustrating a method for forming an air introduction hole in a conventional sensor element.
Figure 11:
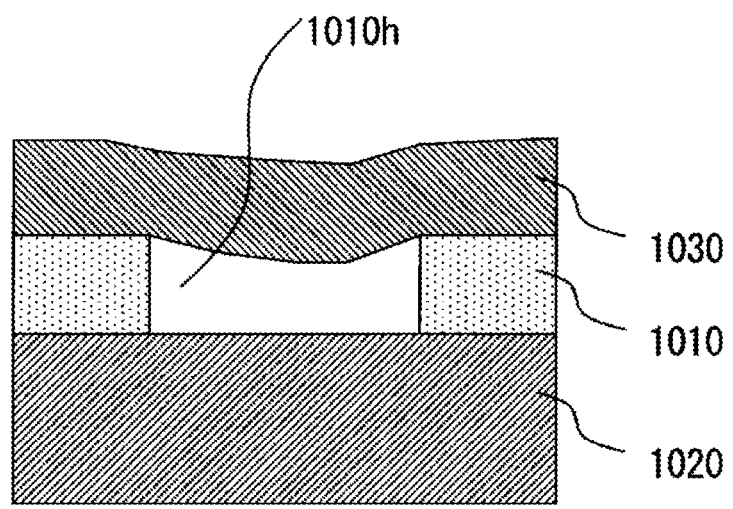
FIG. 11 is a view illustrating a state where the cross section of the air introduction hole is reduced in the conventional sensor element.

As shown in FIG. 9, there is also a case where upper side portions of the unsintered ceramic sheet 130y slightly flow to above the burn-out material sheet 135y in the pressing step. In this case, on the upper side of the air introduction hole 131, protrusions 130p protruding toward the inside of the air introduction hole 131 are formed at both side faces. The cross-sectional area of each protrusion 130p is also small enough to be ignored when compared with the cross-sectional area of the air introduction hole 131.

Without being limited to the above embodiments, the present invention is applicable to any gas sensor (sensor element) that has an air introduction hole, and is applicable to an oxygen sensor (oxygen sensor element) of the present embodiment. It is needless to say that, not limited to such applications, the present invention is applicable to various modifications and equivalents encompassed in the idea and the scope of the present invention. For example, the present invention may be applied to a NOx sensor (NOx sensor element) that detects the NOx concentration in the measurement target gas and an HC sensor (HC sensor element) that detects the HC concentration.

In addition, the shape and dimensions of the air introduction hole are not limited. However, when the air introduction hole has an opening, the opening is provided at one place only in the unsintered ceramic sheet. This is because if openings are present at two places in the unsintered ceramic sheet, the sheet is divided into two or more pieces.

The magnitudes of the thicknesses of the unsintered ceramic sheet and the burn-out material sheet are not also limited. The burn-out material sheet may be thinner than the unsintered ceramic sheet. In this case, the thickness of the unsintered ceramic sheet is reduced through pressing, and the internal dimensions of the pre-sintering hollow space are reduced toward the burn-out material sheet, whereby the burn-out material sheet is tightly fitted in the pre-sintering hollow space.

DESCRIPTION OF REFERENCE NUMERALS 10, 10B sensor element
120 first layer
123, 125 pair of electrodes
123 one of electrodes
130, 230 ceramic layer
131, 231, 232 air introduction hole (hollow space)
130x, 230x unsintered ceramic sheet
131x, 231x, 232x pre-sintering hollow space
135x, 235x burn-out material sheet
140 second layer
O axial line

The invention claimed is:

1. A method for manufacturing a sensor element, the sensor element extending in a direction of an axial line, having a plate shape, and including
a pair of electrodes,
a ceramic layer having a hollow space that is to be an air introduction hole and that extends in the direction of the axial line, and
a first layer and a second layer respectively stacked on both surfaces of the ceramic layer so as to cover the hollow space,
one of the electrodes being in communication with the hollow space,
the method comprising:
a preparation step of preparing
an unsintered ceramic sheet to be the ceramic layer after sintering, the unsintered ceramic sheet having a pre-sintering hollow space in a portion corresponding to the hollow space, and
a burn-out material sheet having smaller dimensions than the pre-sintering hollow space when viewed in a plane direction of the unsintered ceramic sheet, the burn-out material sheet having a thickness different from that of the unsintered ceramic sheet, the burn-out material sheet having, in a plane orthogonal to the direction of the axial line, a cross-sectional area substantially identical to a cross-sectional area of the pre-sintering hollow space;
a placement step of accommodating the burn-out material sheet inside the pre-sintering hollow space of the unsintered ceramic sheet;
a pressing step of, after the placement step, pressing the unsintered ceramic sheet and the burn-out material sheet so as to have an identical thickness; and
a sintering step of, after the pressing step, sintering the unsintered ceramic sheet and the burn-out material sheet to burn out the burn-out material sheet and make the unsintered ceramic sheet into the ceramic layer, thereby forming the hollow space.

2. The method for manufacturing the sensor element according to claim 1, wherein
a periphery of the pre-sintering hollow space is closed by the unsintered ceramic sheet.

3. The method for manufacturing the sensor element according to claim 1, wherein
a front end or a rear end in the direction of the axial line of the pre-sintering hollow space has an opening, and an end, of the burn-out material sheet, directed to the opening is closed in the pressing step.

4. The method for manufacturing the sensor element according to claim 1, wherein
after the pressing step, in a plane orthogonal to the direction of the axial line, the cross-sectional area of the pre-sintering hollow space and the cross-sectional area of the burn-out material sheet are substantially identical to each other.

\* \* \* \* \*